(12) United States Patent
Shimada et al.

(10) Patent No.: US 6,208,503 B1
(45) Date of Patent: Mar. 27, 2001

(54) SOLID ELECTROLYTIC CAPACITOR AND PROCESS FOR PRODUCING THE SAME

(75) Inventors: Akihiro Shimada; Katsunori Nogami; Toshiyuki Murakami; Atsuko Kaneko, all of Tokyo (JP)

(73) Assignee: Nippon Chemi-Con Corporation, Tokyo (JP)

( * ) Notice: Subject to any disclaimer, the term of this patent is extended or adjusted under 35 U.S.C. 154(b) by 0 days.

(21) Appl. No.: 09/445,040

(22) PCT Filed: May 6, 1998

(86) PCT No.: PCT/JP98/02499

§ 371 Date: Feb. 15, 2000

§ 102(e) Date: Feb. 15, 2000

(87) PCT Pub. No.: WO98/56021

PCT Pub. Date: Dec. 10, 1998

(30) Foreign Application Priority Data

Jun. 6, 1997 (JP) .................................................. 9-165230
Jun. 6, 1997 (JP) .................................................. 9-165231
Sep. 16, 1997 (JP) .................................................. 9-250237

(51) Int. Cl.$^7$ .................................................. H01G 9/00
(52) U.S. Cl. .................... 361/523; 361/525; 361/528; 361/532; 361/511
(58) Field of Search ............................ 361/523, 525, 361/528, 532, 504, 511–512, 530, 529, 314–315; 252/500, 62.2, 513; 428/209, 921; 29/25.03; 429/192, 209, 129, 218, 245, 247, 146

(56) References Cited

U.S. PATENT DOCUMENTS 5,914,852   6/1999   Hatanaka et al. ............... 361/523

FOREIGN PATENT DOCUMENTS 215611      1/1990   (JP) .
9-293639    11/1997  (JP) .

*Primary Examiner*—Anthony Dinkins
(74) *Attorney, Agent, or Firm*—Price and Gess

(57) ABSTRACT

A capacitor element (10) fabricated by winding an anode foil (1) and a cathode foil (2) via a separator (3) is impregnated with a 3,4-ethylenedioxythiophene and an oxidizing agent to form poly(ethylenedioxythiophene) by chemical polymerization. A nonwoven fabric composed chiefly of a synthetic fiber is used as a separator, enabling a solid electrolyte to be favorably formed without being reacted with the oxidizing agent. Preferably, the capacitor element is dipped in water at 80 to 100° C. for 1 to 20 minutes to dissolve and remove the binder in the separator in order to preclude adverse effects on the electric characteristics caused by the binder. The oxidizing agent is used at a concentration in excess of 40% by weight with respect to the solvent, so that the degree of polymerization is high and a dense and homogeneous solid electrolytic layer is formed. To form the electrolytic layer, the capacitor element is impregnated with a monomer solution prepared by mixing 3,4-ethylenedioxythiophene and a volatile solvent at a volume ratio of 1:1 to 1:3. Then, the capacitor element is heat-treated and impregnated with a solution of oxidizing agent to form a dense and homogenous solid electrolytic layer.

16 Claims, 2 Drawing Sheets

SOLID ELECTROLYTIC CAPACITOR AND PROCESS FOR PRODUCING THE SAME

TECHNICAL FIELD

The present invention relates to a process for producing a solid electrolytic capacitor and more specifically, relates to a solid electrolytic capacitor using a conducting polymer as the electrolyte.

BACKGROUND OF THE INVENTION

1. Conventional Materials for Solid Electrolytic Layer

Electrolytic capacitors comprise an oxide film layer functioning as a dielectric material and an electrode drawn out from the oxide film layer, the oxide film layer being formed on an anode electrode comprising a valve action metal such as tantalum and aluminium and being arranged with micropores and etching pits.

Herein, the electrode is drawn out, via an electrolytic layer with electric conductivity, from the oxide film layer. Accordingly, the electrolytic layer serves as a practical cathode in such electrolytic capacitors. For an aluminium electrolytic capacitor, for example, a liquid electrolyte is used as a practical electrode, while the cathode electrode only serves for the electrical connection between the liquid electrolyte and an external terminal.

The electrolytic layer functioning as a practical cathode should essentially be adhesive to the oxide film layer, and be dense and uniform. Specifically, the adhesion inside the micro-pores and etching pits of the anode electrode significantly influences the electrical performance. Conventionally, therefore, numerous electrolytic layers have been proposed.

Solid electrolytic capacitors comprise solid electrolytes with electric conductivity, in place of liquid electrolytes defective of any impedence characteristic in the high-frequency region due to the ion conductivity. Specifically, manganese dioxide and 7, 7, 8, 8-tetracyanoquinodimethane (TCNQ) complex have been known as such solid electrolytes.

More specifically, a solid electrolytic layer comprising manganese dioxide is produced by dipping an anode element comprising sintered tantalum in an aqueous manganese nitrate solution, followed by thermal decomposition at a temperature around 300° C. to 400° C. The oxide film layer in capacitors comprising such solid electrolytic layer is readily damaged during the thermal decomposition of manganese dioxide, so the leakage current is likely to increase; because the specific resistance of manganese dioxide is high, additionally, the resulting impedance characteristic is not sufficiently satisfactory.

Furthermore, the lead wire is damaged at the thermal process. Therefore, a post-process is needed to additionally arrange an outer connecting terminal.

Alternatively, a solid electrolytic capacitor comprising the TCNQ complex as described in Japanese Patent Laid-open No. 58-191414 has been known as one of the aforementioned solid electrolytic capacitors, which is produced by thermally melting the TCNQ complex, and dipping an anode electrode in the resulting melt TCNQ complex or coating the resulting melt TCNQ complex on the anode electrode. The TCNQ complex is highly conductive, with the resultant great effects in terms of frequency characteristic and temperature performance.

Because the melting point of the TCNQ complex and the decomposition point thereof are very close so the melt TCNQ complex is readily converted to an insulating substance under some temperature condition, the temperature control of the complex is tough during the process of capacitor production; additionally because the TCNQ complex per se is defective of thermal resistance. the characteristic properties of the complex are distinctively modified by the soldering heat during the mounting process on a print board.

2. Application of Conducting Polymer

So as to overcome the inconvenience of manganese dioxide and TCNQ complex, furthermore, attempts have been made in recent years about the use of conducting polymers such as polypyrrole as solid electrolytic layer.

Conducting polymers typically including polypyrrole are primarily produced by chemical oxidation polymerization (chemical polymerization) and electrolytic oxidation polymerization (electrolytic polymerization). It has been difficult to produce a dense layer with a large strength by chemical polymerization.

By electrolytic polymerization, alternatively, a voltage should be applied to a subject material on which an oxide film layer is to be formed. Therefore, it is difficult to apply electrolytic polymerization to an anode electrode with an insulating oxide film layer formed on the surface thereof for electrolytic capacitors. Hence, a process has been proposed, comprising preliminarily forming a conductive precoating layer, for example a conducting polymer layer formed by chemical polymerization using an oxidant, on the surface of an oxide film layer, and subsequently forming an electrolytic layer by electrolytic polymerization using the precoating layer as an electrode (Japanese Patent Laid-open 63-173313, Japanese Patent Laid-open 63-158829; manganese dioxide functions as the precoating layer).

However, the process of preliminarily forming the precoating layer is complicated; and by electrolytic polymerization, a solid electrolytic layer is formed, starting from the proximity of an outer electrode arranged on the positive electrode face covered with the oxide film layer for the purpose of polymerization. Accordingly, it has been very difficult to continuously form a conducting polymer film of a uniform thickness over a wide range.

Thus, another attempt has been made to form an electrolytic layer comprising a conducting polymer film, by winding an anode electrode and a cathode electrode, both in foil shapes, while a separator is interposed between these electrodes, to form a so-called wound capacitor element, allowing the capacitor element to be impregnated with a monomer such as pyrrole and an oxidant, to form the conducting polymer film by chemical polymerization alone.

Such wound capacitor element has been known for aluminium electrolytic capacitors. It has been desired to avoid any complicated electrolytic polymerization by supporting the conducting polymer layer with a separator and to enlarge the capacity of the resulting capacitor by using an electrode in a foil shape of a larger surface area.

Both the electrodes and the separator can be supported at a constant fastening strength by using the wound capacitor element, which is indicated to make contribution to the adhesion between both the electrodes and the electrolytic layer.

When the capacitor element is impregnated with a mixture solution of the monomer and an oxidant, the monomer and the oxidant are rapidly polymerized together, so that the resulting solid electrolytic layer is never formed deeply inside the capacitor element. Thus, it has been found that the desired electrical performance can never be yielded.

Then, an attempt has been made to lower the polymerization temperature of the solution during the polymerization reaction, with the resultant more or less great electrical performance. Nevertheless, the resulting pressure resistance is still insufficient, disadvantageously.

Additionally, chemical polymerization at low temperature requires strict temperature control and a complicated apparatus, so that the final product is disadvantageously costly.

3. Poly(ethylenedioxythiophene) of Interest

Alternatively, various conducting polymers have been examined. A technique (Japanese Patent Laid-open 2-15611) focused on poly(ethylenedioxythiophene) (PEDT) at a slow reaction velocity and with excellent adhesion to the oxide film layer of the anode electrode has been reported.

With attention focused on the slow polymerization velocity of poly(ethylenedioxythiophene), the present inventors have submitted an application (Japanese Patent application 8-131374) of an invention to generate poly(ethylenedioxythiophene) inside a capacitor element, comprising winding through the medium of a separator an anode electrode foil and a cathode electrode foil to fabricate a capacitor element, allowing the capacitor element to be impregnated with a mixture solution of a monomer and an oxidant solution, and generating a solid electrolyte poly(ethylenedioxythiophene) by the chemical polymerization of the monomer and the oxidant. The polymerization proceeded slowly.

4. Problems that the Invention is to Solve

A solid electrolytic capacitor produced by allowing a capacitor element to be impregnated with a mixture solution of a monomer and an oxidant by using a separator for use in general electrolytic capacitors to generate poly(ethylenedioxythiophene), never exerts satisfactory ESR performance; and additionally, the static capacity and life of the resulting solid electrolytic capacitor are at large variations. This is possibly due to the facts that the use of such general separators is inconvenient for the generation of poly(ethylenedioxythiophene) and that the conditions for allowing the capacitor element to be impregnated with a monomer and an oxidant are not satisfactory. The finding is now described in more detail below.

Because an oxidant ferric p-toluenesulfonate is used for the generation of poly(ethylenedioxythiophene), separators composed of manila paper for use in general electrolytic capacitors induce a chemical reaction, damaging the oxidative action of the oxidant and additionally causing an accident such as short circuit due to the separator damage.

On contrast, glass paper and the like are potentially useable for the separator, but glass paper of general thickness of 80 to 200 $\mu$m is hardly slimmed approximately to the thickness of manila paper separator of 40 $\mu$m; and because the folding strength is more or less small, a small-size product is hardly produced. Because glass paper is not hydrophilic, a conductive dense and uniform polymer layer, namely solid electrolytic layer, is hardly formed, which possibly affects the electrical performance of the resulting capacitor, disadvantageously.

Additionally, simple impregnation with a mixture solution of a monomer and an oxidant solution does not yield a polymer at a satisfactory polymerization degree, so that a sufficiently dense and uniform solid electrolytic layer is hardly formed inside the resulting capacitor element. During the impregnation with a mixture solution of a monomer and an oxidant solution, in particular, the polymerization reaction of the mixture solution progresses over time, so that the capacitor element is impregnated with the mixture solution, in the course of the polymerization reaction. Thus, the mixture solution is solidified intermediately on the way of the permeation of the mixture solution inside the capacitor element, whereby the resulting solid electrolytic layer is likely to be non-uniform. So as to permeate the mixture solution further inside the capacitor element in order to compensate such intermediate solidification of the mixture solution, the capacitor element should continuously be impregnated with the mixture solution. However, such continuous impregnation of the mixture solution costs needless materials and a longer time, with the resultant decrease of the productivity.

5. Objects of the Invention

The present invention has been proposed so as to overcome the problems. An object resides in the production of a solid electrolytic layer comprising a dense and uniform conducting polymer inside a wound capacitor element, by modifying the separator for use in the capacitor element and the impregnation conditions of the capacitor element with a monomer and an oxidant, to provide a solid electrolytic capacitor with excellent electrical performance and a large capacity. Additionally, the other object is to provide a process for producing such great solid electrolytic capacitor at a high efficiency and a high productivity.

DISCLOSURE OF THE INVENTION

So as to achieve the objects, in accordance with the invention, a modified solid electrolytic capacitor is provided, which is produced by winding through the medium of a separator an anode electrode foil and a cathode electrode foil to fabricate a capacitor element, allowing the capacitor element to be impregnated with 3,4-ethylenedioxythiophene and an oxidant to generate poly(ethylenedioxythiophene) by chemical polymerization; and a process for producing such solid electrolytic capacitor is also provided.

In accordance with the invention, a solid electrolytic capacitor with a modified separator comprising a nonwoven fabric composed chiefly of a synthetic fiber is provided. The nonwoven fabric is preferably vinylon fiber or vinylon fiber mixed with glass fiber, polyester fiber, nylon fiber, rayon fiber or paper fiber. Since the separator composed chiefly of such synthetic fiber never reacts with any oxidant and is miscible with solvents, the monomer and an oxidant can readily permeate inside the wound capacitor element, so that a dense and uniform solid electrolytic layer can be yielded. Additionally, such separator is thinner and more flexible than a glass paper of a thickness of 80 to 200 $\mu$m, so that the quantities of the wound electrode foils and the separator are increased per each unit volume.

It has been found that the separator using the nonwoven fabric composed chiefly of such synthetic fiber can hardly yield the desired static capacity or thermal resistance. The reason is not yet found, but the binder in the nonwoven fabric may possibly have some influence. Based on the possibility, in accordance with the invention, a process for producing a solid electrolytic capacitor with a modified separator is provided, comprising dipping the wound capacitor element in water at 80° C. to 100° C. for one to 10 minutes to dissolve the binder in the separator in water and then discard the binder and allowing the resulting separator to be impregnated with 3,4-ethylenedioxythiophene and in oxidant. The process may comprise dissolving and discarding the binder in the separator, drying the capacitor element at 80° C. to 100° C., and thereafter allowing the capacitor element to be impregnated with 3,4-ethylenedioxythiophene and an oxidant. More preferably, a series of processes, namely the process of discarding the binder in water and the subsequent drying process, is repeated at least two times.

In accordance with the invention, additionally, a process of modifying the conditions for the impregnation with the monomer and an oxidant is provided, comprising the impregnation with 3,4-ethylenedioxythiophene and an oxidant at a concentration above 40% by weight to a solvent. The solvent is preferably butanol, while the oxidant is preferably selected from the group consisting of p-toluenesulfonic acid, ferric dodecylbenzenesulfonate and ferric chloride. Sufficient ESR characteristic cannot be recovered when an oxidant is used at a concentration below 40% by weight to a solvent. However, the ESR characteristic can be improved, distinctively, by using an oxidant at a concentration above 40% by weight to a solvent.

In accordance with the invention, still furthermore, a process of modifying the conditions for the impregnation with the monomer and an oxidant is provided, comprising allowing the capacitor element to be impregnated with the monomer 3,4-ethylenedioxythiophene and subsequently allowing the resulting capacitor element to be impregnated with an oxidant. Because the monomer for primary impregnation and distribution thereafter inside the capacitor element can be polymerized chemically with the oxidant for subsequent impregnation inside the capacitor element, a dense and uniform solid electrolytic layer can be generated inside the wound capacitor element according to the process. More preferably, the monomer is diluted with a volatile solvent and is then thermally treated; and then, an oxidant solution is used for the impregnation. Because the diluted monomer is used for the uniform impregnation of the capacitor element and the volatile solvent therein can be vaporized by the subsequent thermal process, in this case, a solid electrolytic layer of higher quality can be produced. Additionally because the thermal process requires only a short time, the productivity is also great.

The volatile solvent for use according to the process is preferably selected from the group consisting of hydrocarbons, ethers, esters, ketones, alcohols and nitrogen compounds. These materials are satisfactorily miscible with the monomer to promote the uniform impregnation with the monomer, with no disadvantageous effect on the electrode foils comprising for example aluminium. Methanol, ethanol and acetone are more preferable owing to the economy and ready handleability. At the process of allowing the capacitor element to be impregnated with a monomer solution, furthermore, the monomer solution is first prepared by mixing together a monomer and a volatile solvent, but the composition thereof possibly changes over time due to the evaporation of the volatile solvent after the mixing process. Hence, the monomer and the volatile solvent are preferably used separately for the impregnation. In this case, the capacitor element can be impregnated with a monomer solution with less compositional change. By allowing the capacitor element to be impregnated with a monomer solution at a ratio of the monomer and a volatile solvent being 1:1 to 1:3, the capacitor element can be uniformly impregnated with the monomer, with the resultant high-quality solid electrolytic layer. Because the volatile solvent is used at the lowest limit as needed in this case, furthermore, the productivity is never lowered.

BEST MODE FOR CARRYING OUT THE INVENTION

Best mode for carrying out the invention is specifically described with reference to drawings.

1. Essential Production Process

Figure 1:
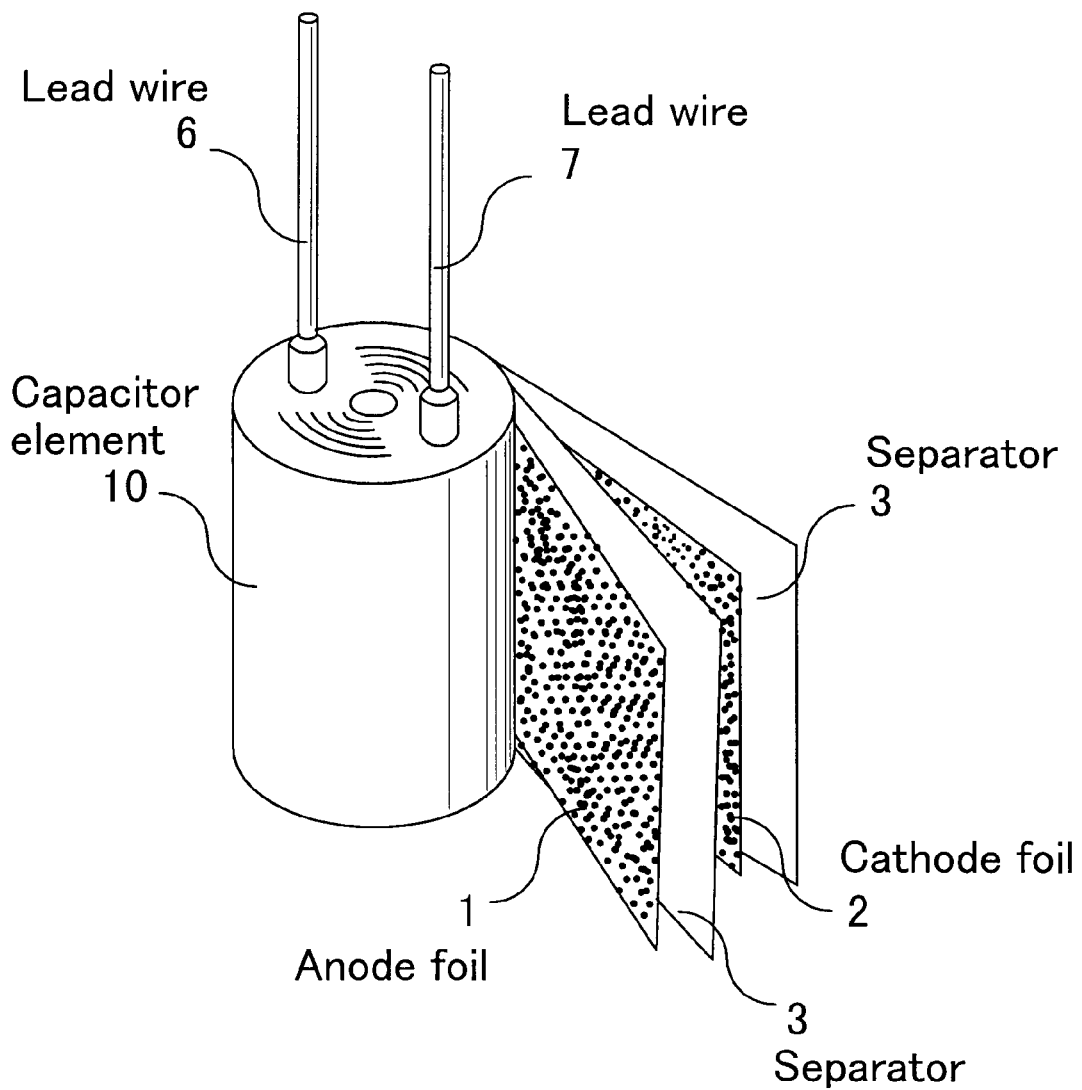
FIG. 1 is a decomposition perspective view of one example of the solid electrolytic capacitor produced in accordance with the invention.

FIG. 1 depicts the solid electrolytic capacitor produced in accordance with the invention, which is essentially produced by the following procedures.

First, capacitor element 10 is fabricated by winding anode electrode foil (positive electrode foil) 1 comprising a valve action metal such as aluminium with an oxide film layer formed on the surface thereof and cathode electrode foil (negative electrode foil) 2 through the medium of separator 3. Then, the capacitor element 10 is impregnated with 3,4-ethylenedioxythiophene and an oxidant; through chemical polymerization in the capacitor element 10, solid electrolytic layer 5 comprising poly(ethylenedioxythiophene) is formed. The solid electrolytic layer 5 is supported with the separator 3.

Figure 2:
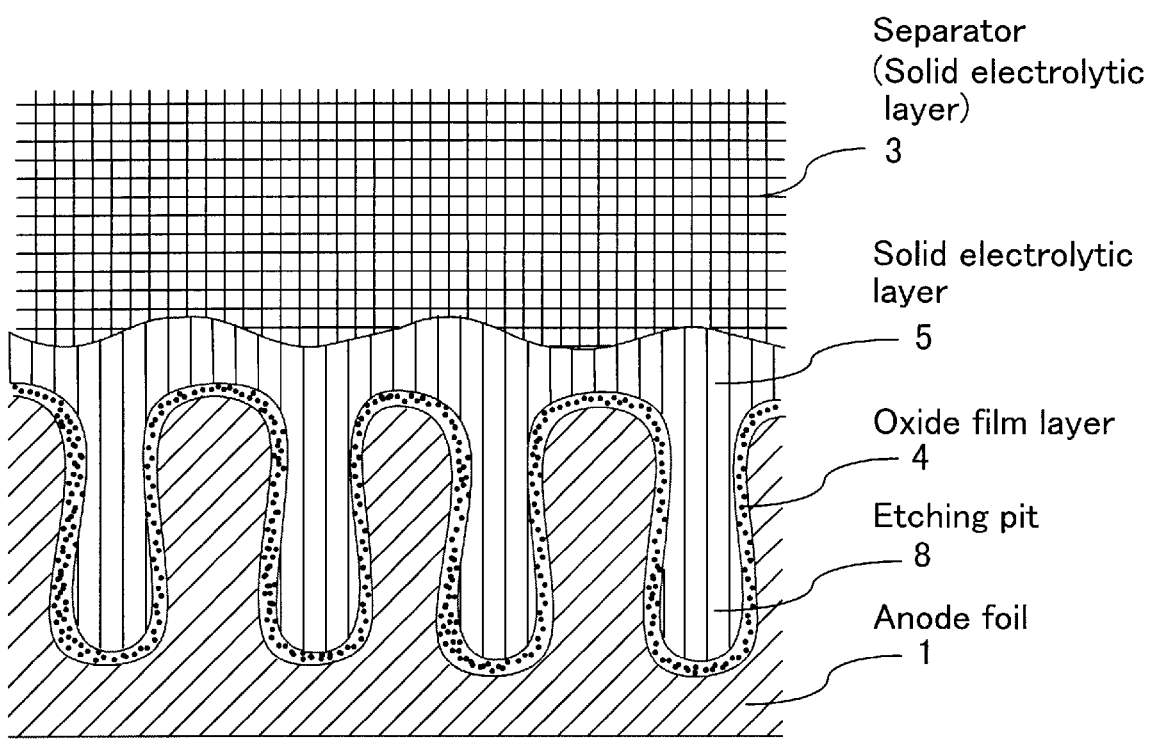
FIG. 2 is an enlarged cross sectional view depicting an anode electrode foil with the solid electrolytic layer formed in accordance with the invention.

More specifically, the positive electrode foil 1 comprises a valve action metal such as aluminium; as shown in FIG. 2, the surface thereof is roughened by electro-chemical etching process in an aqueous chloride solution, to form numerous etching pits 8, 8, - - - . Furthermore, a voltage is applied to the surface of the positive electrode foil 1 in an aqueous solution of for example ammonium borate, to form oxide film layer 4 functioning as a dielectric material. Like the positive electrode foil 1, the negative electrode foil 2 comprises aluminium and the like; and the surface thereof is simply treated with etching process.

The positive electrode foil 1 and the negative electrode foil 2 are separately connected with lead wires 6,7 by known means such as stitch or ultrasonic welding, to connect these electrodes outside. The lead wires 6, 7 comprising aluminium and the like compose outer connection parts responsible for the electrical connection of the positive electrode foil 1 and the negative electrode foil 2 to the outside. The lead wires 6, 7 are drawn out from the end face of the wound capacitor element 10.

The dimensions of both the electrode foils 1, 2 are appropriately determined, depending on the specification of a designed solid electrolytic capacitor; and the separator 3 of a slightly larger width than the widths of both the electrode foils 1, 2 is satisfactorily used.

Herein, 3,4-ethylenedioxythiophene can be prepared by the known process disclosed in Japanese Patent Laid-open 2-15611 and the like. Additionally, ferric p-toluenesulfonate dissolved in butanol is used as the oxidant.

2. Solid Electrolytic Capacitor with Modified Separator

One embodiment of the modified separator in accordance with the invention comprises a nonwoven fabric composed chiefly of vinylon fiber; another embodiment thereof comprises a nonwoven fabric composed of a mixture of vinylon fiber with glass fiber, polyester fiber, nylon fiber, rayon fiber or paper fiber such as manila paper. More specifically, the nonwoven fabric is at a unit weight of 6 to 36 g/m2, a fiber diameter of 5 to 30 $\mu$m, a thickness of 30 to 150 $\mu$m and a density of 0.2 to 0.5 g/cm3.

Because the resulting modified separators never chemically react with the oxidant and are miscible with the solvent for the oxidant, the modified separators can improve the efficiency of the resulting capacitor element per unit volume, despite the thickness approximately equal to the thickness (40 $\mu$m) of manila paper separators for use in conventional electrolytic capacitors, with no deterioration of the permeability of the monomer and oxidant for use in the impregnation. Accordingly, the resulting solid electrolytic capacitor can be down-sized and have a larger capacity.

The solid electrolytic capacitor with such modified separator can be produced, by forming a wound capacitor element using the separator, dipping the capacitor element in water at 80° C. to 100° C. for one to 10 minutes to dissolve and remove the binder in the separator, drying the resulting capacitor element at 80° C. to 120° C., and subsequently allowing the capacitor element to be impregnated with 3,4-ethylenedioxythiophene and an oxidant.

Because the binder in the nonwoven fabric composing the separator can be dissolved and removed by the process, the reduction of the static capacity due to the presence of the binder can be prevented. Accordingly, the capacitor performance can be improved.

A specific process for producing the solid electrolytic capacitor with the modified separator is now specifically described below, along with examples of the solid electrolytic capacitor produced by the process, compared with comparative examples.

2.1 Comparison Between Modified Separator and Glass Separator

First, comparison will be made between the solid electrolytic capacitor with the modified separator (Example 1) in accordance with the invention and a solid electrolytic capacitor with a separator composed of glass paper (Comparative Example 1).

EXAMPLE 1

The positive electrode foil 1 and the negative electrode foil 2 are wound through the medium of separator 3 comprising a nonwoven fabric composed chiefly of a vinylon fiber at a 50-$\mu$m thickness and a unit weight of 12 g/m2, to fabricate capacitor element 10 as shown in FIG. 1. Herein, the capacitor element 10 is at a diameter of 4 $\phi$ and a longitudinal length of 7 mm and with a nominal voltage of 16 WV and a nominal static capacity of 10 $\mu$F.

By dipping the capacitor element 10 in water at 100° C. for 5 minutes, the binder in the separator 3 is dissolved therein and is then removed. If necessary, the step may satisfactorily be repeated several times at a given interval.

Then, the capacitor element 10 is impregnated with 3,4-ethylenedioxythiophene and an oxidant. As descried above, herein, ferric p-toluenesulfonate dissolved in butanol is used as the oxidant. Additionally, the blend ratio of 3,4-ethylenedioxythiophene and the oxidant is for example 1:5.

By leaving the capacitor element 10 impregnated with 3,4-ethylenedioxythiophene and the oxidant to stand alone for polymerization at a polymerization temperature of 25° C. to 150° C. for a duration of 2 to 15 hours, solid electrolytic layer 5 comprising poly(ethylenedioxythiophene) can be produced.

As to the ranges of the polymerization temperature and the duration during which the capacitor element 10 is left to stand, a higher polymerization temperature is likely to deteriorate the leakage current characteristic although the static capacity, tan $\delta$ and the impedence characteristic are improved, among the electrical properties of the resulting solid electrolytic capacitor. Thus, the polymerization temperature can appropriately be modified within the range, depending on the specification of the designed capacitor element 10.

At the aforementioned steps, the solid electrolytic layer 5 is formed on the separator 3 interposed between the positive electrode foil 1 and the negative electrode foil 2; by subsequently covering the exterior surface of the resulting capacitor element 10 with an exterior resin, a solid electrolytic capacitor can be recovered.

Comparative Example 1

The positive electrode foil 1 and the negative electrode foil 2 are wound through the medium of a separator composed of a glass paper at a 150-$\mu$m thickness and a unit weight of 20 g/m2, to fabricate a capacitor element as shown in FIG. 1. Under the same conditions as in Example 1, the capacitor element is impregnated with 3,4-ethylenedioxythiophene and the oxidant, to forme a solid electrolytic layer comprising poly(ethylenedioxythiophene), followed by covering with an exterior resin, to recover a solid electrolytic capacitor with a nominal voltage of 16 WV and a nominal static capacity of 10 $\mu$F.

Comparison of Initial Performances

The initial performances of the solid electrolytic capacitors of Example 1 and Comparative Example 1 were determined. The results are shown below in Table 1. Herein, the term capacity occurrence ratio means the ratio of the determined static capacity to the nominal static capacity.

TABLE 1

|  | Static capacity 120 Hz ($\mu$F) | Capacity occurrence ratio (%) | tan $\delta$ 120 Hz (%) | ESR 100 KHz ($\Omega$) | Leakage current 20 V ($\mu$A) |
| --- | --- | --- | --- | --- | --- |
| Comparative Example 1 | 8.6 | 86.0 | 1.8 | 0.065 | 0.23 |
| Example 1 | 9.4 | 94.0 | 1.8 | 0.070 | 0.15 |

As apparently shown in Table 1, the solid electrolytic capacitor of Example 1 wherein the 50-$\mu$m thick separator comprising the nonwoven fabric composed chiefly of the vinylon fiber can exert the properties at almost the same levels of those of Comparative Example 1 using a 150-$\mu$m thick separator composed of the glass paper. Therefore, the capacity efficiency of Example 1 using the separator of a thickness $\frac{1}{3}$-fold that of the separator of Comparative Example 1 is apparently improved far better than Comparative Example 1.

2.2 Comparison of Binder Effect

EXAMPLE 2

In the same manner as in Example 1, the positive electrode foil 1 and the negative electrode foil 2 are wound through the medium of separator 3 comprising a nonwoven fabric composed chiefly of a vinylon fiber at a 50-$\mu$m thickness and a unit weight of 12 g/m2, to fabricate capacitor element 10. After dipping the resulting capacitor element 10 in water at 100° C. for 5 minutes to dissolve and remove the binder in the separator, the capacitor element 10 is dried at 100° C. for 10 minutes.

Under the same conditions as in Example 1, the capacitor element 10 is impregnated with 3,4-ethylenedioxythiophene and an oxidant, to form a solid electrolytic layer comprising poly(ethylenedioxythiophene), followed by covering with an exterior resin, to produce a solid electrolytic capacitor at a nominal voltage of 6.3 WV and a nominal static capacity of 33 $\mu$F.

EXAMPLE 3

The capacitor element 10 fabricated in the same manner as in Example 2 is subjected two times in a repetitious manner to a series of steps, namely a step of dissolving and removing the binder in the separator by dipping the capacitor element 10 in water at 100° C. and a step of drying the resulting capacitor element 10 at 100° C. for 10 minutes. Under the same conditions as in Example 1, the capacitor element 10 is impregnated with 3,4-ethylenedioxythiophene and the oxidant, to form a solid electrolytic layer comprising poly(ethylenedioxythiophene), followed by covering with an exterior resin, to recover a solid electrolytic capacitor at a nominal voltage of 6.3 VW and a nominal static capacity of 33 μF.

Comparative Example 2

In the same manner as in Example 1, the positive electrode foil 1 and the negative electrode foil 2 are wound through the medium of separator 3 comprising a nonwoven fabric composed chiefly of a vinylon fiber at a 50-μm thickness and a unit weight of 12 g/m2, to fabricate capacitor element 10. By dipping the capacitor element 10 with 3,4-ethylenedioxythiophene and an oxidant under the same conditions as in Example 1, with no step of dissolving and removing the binder in water or no subsequent drying step, a solid electrolytic capacitor at a nominal voltage of 6.3 WV and a nominal static capacity of 33 μF is produced.

Comparison of Initial Performances

The initial performances of the solid electrolytic capacitors of Examples 2 and 3 and Comparative Example 1 were determined. The results are shown below in Table 2. As described above, herein, the term capacity occurrence ratio means the ratio of the determined static capacity to the nominal static capacity.

TABLE 2

|  | Static capacity 120 Hz (μF) | Capacity occurrence ratio (%) | tan δ 120 Hz (%) | ESR 100 KHz (Ω) | Leakage current 6.3 V (μA) |
| --- | --- | --- | --- | --- | --- |
| Comparative Example 2 | 28.1 | 85.2 | 6.1 | 0.035 | 5.10 |
| Example 2 | 31.5 | 95.5 | 5.1 | 0.045 | 4.45 |
| Example 3 | 32.8 | 99.4 | 6.2 | 0.037 | 1.50 |

As apparently shown in Table 2, the capacity occurrence ratios of the solid electrolytic capacitors of Examples 2 and 3 with the binder removal process are larger than the ratio of the solid electrolytic capacitor of Comparative Example 2 with no binder removal process, suggesting that the effect of the binder in the nonwoven fabric composed of synthetic fiber is reduced. As described above, more specifically, the removal of the binder in the separator comprising the nonwoven fabric composed chiefly of synthetic fiber may possibly bring the desired static capacity and thermal resistance, which can hardly be recovered by such separator unless the binder is removed from the separator.

As apparent on comparison between Examples 2 and 3, furthermore, the capacity occurrence ratio in Example 3 is larger than the ratio in Example 2, because a series of steps, namely the step of dissolving and removing the binder in water and the subsequent drying step, is repeated two times in Example 3 but is carried out only once in Example 2. Thus, it is indicated that two or more repetitions of the series of these steps can reduce the binder effect.

2.3 Modification Example

The process using the modified separator is not specifically limited to the aforementioned process but can be modified appropriately. The nonwoven fabric composing the separator is not limited to those in Examples 1 to 3 but includes appropriate types of nonwoven fabrics composed chiefly of synthetic fiber. From the respects of down-sizing and capacity increase, the separator is preferably at a thickness of about 50 μm or less, whereby a capacitor at a dimension and nominal values nearly equal to the dimension and nominal values, respectively of a conventional separator composed of manila paper, can be recovered.

3. Process Using Oxidant at Modified Concentration

In one embodiment of the inventive process, ferric p-toluenesulfonate dissolved in a solvent butanol is used as the oxidant. It is found that the oxidant at a concentration above 40% by weight to butanol can yield great results in this case. The reason is not yet elucidated, but the oxidant at a high concentration promotes chemical polymerization to elevate the polymerization degree, so that the electric conductivity of the resulting solid electrolytic layer can be improved.

The oxidant is blended at a concentration above 40% by weight in butanol, because sufficient static capacity or ESR characteristic can never be recovered below 40% by weight. Furthermore, the substantial upper limit is about 60% by weight. Synthetic reaction with the oxidant above the limit hardly proceeds. Therefore, the oxidant is blended at a concentration within a range of 50% by weight to 55% by weight, from the standpoints so as to recover desired properties and readily proceed the synthesis.

The ratio of butanol and ferric p-toluenesulfonate in the oxidant solution is appropriately determined, but preferably, the ratio is 1:3 to 1:15.

The process for producing the solid electrolytic capacitor using the oxidant at such modified concentration is now specifically described below, along with examples of the solid electrolytic capacitor produced by the process, compared with comparative examples.

3.1 Production Process

The positive electrode foil 1 and the negative electrode foil 2 are wound through the medium of separator 3 comprising a nonwoven fabric composed chiefly of a vinylon fiber, to fabricate capacitor element 10 as shown in FIG. 1. Herein, the capacitor element 10 is at a diameter of 4 φ and a longitudinal length of 7 mm and with a nominal voltage of 16 WV and a nominal static capacity of 10 μF.

Then, the capacitor element 10 is impregnated with 3,4-ethylenedioxythiophene and an oxidant, to form solid electrolytic layer 5 comprising poly(ethylenedioxythiophene). The oxidant comprises ferric p-toluenesulfonate dissolved at six different levels of concentrations (40% by weight in Comparative Example 3; 44% by weight in Example 4; 48% by weight in Example 5; 52% by weight in Example 6; 56% by weight in Example 7; and 60% by weight in Example 8) in butanol. The blend ratio of 3,4-ethylenedioxythiophene and the oxidant is 1:5.

At the aforementioned process, solid electrolytic layer 5 is formed on separator 3 interposed between the positive electrode foil 1 and the negative electrode foil 2; subsequently, the exterior surface of the capacitor element 10 is covered with an exterior resin, to recover a solid electrolytic capacitor.

3.2 Change of Properties Due to Oxidant Concentration

The six types of the solid electrolytic capacitors (Examples 4 to 8 and Comparative Example 3) produced by using the oxidant at different concentrations were examined of the change of their properties due to the difference in oxidant concentration. The results are shown below in Table 3.

As apparently shown in Table 3, no satisfactory ESR characteristic can be procured in Comparative Example 3 using the oxidant ferric p-toluenesulfonate dissolved at 40% by weight in the solvent, while the capacity occurrence ratio in Comparative Example 3 is 30.6 μ F, which corresponds to about 93% of the nominal static capacity (33 μF). The ESR characteristic is dramatically improved in Examples 4 to 8 using the oxidant at a concentration above 40% by weight, which indicates that a dense and uniform solid electrolyte is formed inside the capacitor element.

TABLE 3

|  | Oxidant concentration | Static capacity 120 Hz ($\mu$F) | ESR 100 KHz ($\Omega$) |
|---|---|---|---|
| Comparative Example 3 | 40 wt % | 30.6 | 0.079 |
| Example 4 | 44 wt % | 32.2 | 0.039 |
| Example 5 | 48 wt % | 33.0 | 0.029 |
| Example 6 | 52 wt % | 33.4 | 0.024 |
| Example 7 | 56 wt % | 33.5 | 0.025 |
| Example 8 | 60 wt % | 32.8 | 0.024 |

3.3 Modification Example

The process using the oxidant at the modified concentration is not specifically limited to the aforementioned process but can be modified appropriately. The concentration of the oxidant is not specifically limited to the concentrations in Examples 4 to 8. The concentration can be appropriately selected from concentrations above 40% by weight to the solvent.

4. Process Including Process of Forming Modified Solid Electrolytic Layer

In one embodiment of the inventive process, a solid electrolytic layer is produced by allowing a capacitor element to be impregnated with a monomer solution of a mixture of 3,4-ethylenedioxythiophene and a volatile solvent, subjecting the resulting capacitor element to thermal treatment and subsequently allowing the capacitor element to be impregnated with an oxidant solution.

Known means, for example impregnation under reduced pressure and impregnation under pressure, can be applied to the process of allowing capacitor element 10 to be impregnated with a monomer solution of a mixture of 3,4-ethylenedioxythiophene and a volatile solvent. These means can also be applied to the process of allowing the capacitor element after thermal treatment to be impregnated with an oxidant solution.

As the volatile solvent, additionally, use is made of a material selected from hydrocarbons, ethers, esters, ketones, alcohols and nitrogen compounds. More specifically, pentane and hexane and the like can be used as the hydrocarbons; tetrahydrofuran and dipropyl ether and the like can be used as the ethers; methyl formate and ethyl acetate and the like can be used as the esters; acetone and methyl ether ketone and the like can be used as the ketones. Furthermore, methanol, ethanol and propanol and the like can be used as the alcohols; and acetonitrile and the like can be used as the nitrogen compounds.

Among the volatile materials described above, methanol, ethanol and acetone and the like, in particular, are preferably used as described above. Because water is slightly soluble in 3,4-ethylenedioxythiophene, furthermore, water is not preferably used as the volatile solvent.

The following advantages can be brought about by the aforementioned process.

Because the quantity of the monomer 3,4-ethylenedioxythiophene is far less than the amount of the oxidant, the monomer is readily distributed non-uniformly in the capacitor element 10 when the capacitor element 10 is impregnated with the monomer alone; according to the process, however, the monomer is diluted with volatile solvents such as methanol, ethanol and acetone, whereby the capacitor element 10 is uniformly impregnated with the monomer. In this case, the capacitor element 10 may satisfactorily be impregnated with a monomer solution of a mixture of the monomer and such volatile solvent. According to the process, alternatively, the monomer and the volatile solvent may satisfactorily be used separately for the impregnation of the capacitor element 10, whereby the capacitor element can be impregnated with a monomer solution with less compositional change over time.

By thermally treating the capacitor element 10 impregnated with the monomer and the volatile solvent in such manner, subsequently, the volatile solvent can be vaporize.

By the chemical polymerization between the oxidant used for the impregnation of the capacitor element 10 and the monomer with which the capacitor element 10 is uniformly impregnated, solid electrolytic layer 5 comprising a dense and uniform poly(ethylenedioxythiophene) can be formed inside the wound capacitor element 10.

Because the duration of the thermal treatment is short, the productivity is great. Because methanol, ethanol and acetone with economy and relatively ready handleability are used, the productivity can be more improved.

4.1 Production Process

The positive electrode foil 1 and the negative electrode foil 2 are wound through the medium of separator 3 comprising a nonwoven fabric composed chiefly of the vinylon fiber described above, to fabricate capacitor element 10 as shown in FIG. 1. Herein, the capacitor element 10 is with a nominal voltage of 20 WV and a nominal static capacity of 10 $\mu$F.

The capacitor element 10 is then subjected to a process of forming the modified solid electrolytic layer. First, the capacitor element is impregnated with a monomer solution of a mixture of 3,4-ethylenedioxythiophene and a volatile solvent at a ratio of 1:1 to 1:3 in volume. More specifically, the capacitor element 10 is impregnated with 3,4-ethylenedioxythiophene and a volatile solvent. By thermally treating the capacitor element 10 impregnated with the monomer solution in such manner, the volatile solvent is vaporized.

By thereafter allowing the capacitor element 10 to be impregnated with an oxidant solution, solid electrolytic layer 5 is formed by chemical polymerization between the oxidant solution and the monomer solution permeated into the separator 3. As the oxidant, herein, use is made of ferric p-toluenesulfonate dissolved in butanol. In this case, the ratio of butanol and ferric p-toluenesulfonate is appropriately determined; one example is a 40 to 60% butanol solution of ferric p-toluenesulfonate. The blend ratio of 3,4-ethylenedioxythiophene and the oxidant is preferably within a range of 1:3 to 1:6.

After the solid electrolytic layer 5 is formed on the separator 3 interposed between the positive electrode foil 1 and the negative electrode foil 2 according to the processes, the exterior surface of the capacitor element 10 is covered with an exterior resin, to recover a solid electrolytic capacitor.

4.2 Comparison of Processes of Forming Solid Electrolytic Layer

The process of forming the modified solid electrolytic layer is specifically described below, together with specific comparison between the examples of the solid electrolytic capacitor produced by the process and comparative examples.

Table 4 below shows five examples of Examples 9 to 13 of the process of forming the modified solid electrolytic layer and three comparative examples of Comparative Examples 4 to 6 of processes of forming comparative solid electrolytic layer.

The individual examples in Table 4 are now described; in the inventive Example 9, monomer impregnation process and thereafter thermal treatment for about several minutes are carried out prior to oxidant impregnation; in Examples 10 to 13, monomer impregnation process using volatile solvents such as acetone and methanol and thereafter thermal treatment for about several minutes are carried out prior to oxidant impregnation, wherein the different types of the volatile solvents are used at various volume ratios thereof to the monomer.

In Comparative Examples 5 and 6, furthermore, the resulting capacitor element is left to stand alone at ambient temperature with no use of any volatile solvent, wherein the time period from the monomer impregnation to the oxidant impregnation varies. In Comparative Example 4, still furthermore, the conventional technique for impregnation with a mixture solution of a monomer and an oxidant is applied.

| | |
|---|---|
| Comparative Example 4 | impregnation with monomer/oxidant mixture solution |
| Comparative Example 5 | monomer impregnation - oxidant solution impregnation after 15 min |
| Comparative Example 6 | monomer impregnation - oxidant solution impregnation after 60 min |
| Example 9 | monomer impregnation - thermal treatment -oxidant solution impregnation |
| Example 10 | monomer/acetone = 1/1 solution impregnation - thermal treatment - oxidant solution impregnation |
| Example 11 | monomer/acetone = 1/2 solution impregnation - thermal treatment - oxidant solution impregnation |
| Example 12 | monomer/methanol = 1/1 solution impregnation - thermal treatment - oxidant solution impregnation |
| Example 13 | monomer/methanol = 1/2 solution impregnation - thermal treatment - oxidant solution impregnation |

4.3 Comparison Between Initial Performances

The initial performances of the solid electrolytic capacitors of Examples 9 to 13 and Comparative Examples 4 to 6 were individually determined. The results are shown below in Table 5.

As apparently shown in the results of Table 5, the solid electrolytic capacitors of Examples 9 to 13 can exert more excellent performance values of static capacity, tan δ, and equal linear resistance (ESR) than those in Comparative Examples 4 to 6. Additionally, Comparative Examples 5 and 6 show better values than Comparative Example 4; Comparative Example 6 in particular requires a long time for monomer impregnation to oxidant impregnation with lower productivity than the productivity in Examples 9 to 13 with thermal treatment for a short duration for example about several minutes.

TABLE 5

| | Static capacity 120 Hz (µF) | tan δ | ESR 100 KHz (Ω) |
|---|---|---|---|
| Comparative Example 4 | 9.44 | 0.042 | 0.111 |
| Comparative Example 5 | 10.3 | 0.032 | 0.093 |
| Comparative Example 6 | 10.3 | 0.024 | 0.092 |
| Example 9 | 10.1 | 0.036 | 0.077 |
| Example 10 | 10.4 | 0.033 | 0.076 |
| Example 11 | 10.4 | 0.034 | 0.063 |

TABLE 5-continued

| | Static capacity 120 Hz (µF) | tan δ | ESR 100 KHz (Ω) |
|---|---|---|---|
| Example 12 | 10.2 | 0.034 | 0.060 |
| Example 13 | 10.3 | 0.030 | 0.054 |

4.4 Modification Example

A specific process including the process of forming the modified solid electrolytic layer is appropriately selected. Additionally, the process of forming the solid electrolytic layer is not limited to those of Examples 9 to 13. The types of the volatile solvent may appropriately be selected, while the volume ratio of the monomer and the volatile solvent is also appropriately selected within a range of 1:1 to 1:3. In Examples 9 to 13, the capacitor element was impregnated with a monomer solution of a mixture of the monomer and the volatile solvent, but the capacitor element may satisfactorily be impregnated separately with the monomer and with the volatile solvent. In this case, the capacitor element can be impregnated with a monomer solution with less compositional change. Furthermore, the types of the oxidant and the solvent and the ratio thereof can be selected appropriately.

5. Other Embodiments

The present invention is not limited to the aforementioned embodiments and examples. The invention can be carried out in various modification examples within the scope of the invention.

Because the modified separator is individually used in the embodiments relating to the process using the oxidant at the modified concentrations and the embodiments relating to the process including the process of forming the modified solid electrolytic layer, for example, the effects of the modified separator can be brought about. The process including the process of forming the modified solid electrolytic layer by using the oxidant at the modified concentrations, can bring more excellent results. More specifically, the process including the process of forming the modified solid electrolytic layer by using the modified separator and the oxidant at the modified concentrations can bring about synergistic effects of these modifications in separator and oxidant concentration. However, any one of the modifications can still bring about the effect corresponding thereto.

Industrial Applicability

As has been described above, in accordance with the invention, a nonwoven fabric composed chiefly of a synthetic fiber is used as the modified separator; and the nonwoven fabric comprises vinylon fiber, or vinylon fiber mixed with glass fiber, polyester fiber, nylon fiber, rayon fiber or paper fiber.

Such separator never reacts chemically with such oxidant and is miscible with the solvent of the oxidant, although the separator is at a thickness almost equal to the 40-µm thickness of a separator comprising manila paper for use in conventional electrolytic capacitors. Hence, the separator never deteriorates the permeability of the monomer and the oxidant for use in impregnation, to improve the volume efficiency of the resulting capacitor element, so that the resulting solid electrolytic capacitor is of a small size or with a large capacity.

By dipping the capacitor element with such rolled separator in water at 80° C. to 100° C. for one to 10 minutes to dissolve and remove the binder in the separator or by subsequently drying the resulting capacitor element at 80° C. to 120° C., the binder in the separator can be dissolved and removed, whereby the decrease of the static capacity due to the presence of the binder can be prevented.

In accordance with the invention, an oxidant at a modified concentration above 40% by weight to a solvent is used, to form a dense and uniform solid electrolytic layer inside the capacitor element, so that the resulting electrolytic capacitor can acquire excellent ESR characteristic.

In accordance with the invention, furthermore, a process of forming the modified solid electrolytic layer comprises allowing the preliminarily monomer-impregnated capacitor element to be impregnated with an oxidant, to form a dense and uniform solid electrolytic layer inside the wound capacitor element, so that the resulting electrolytic capacitor can procure excellent electrical performance and a larger static capacity.

Typically, the inventive process comprises allowing the capacitor element to be impregnated with a monomer solution of a mixture of a monomer and a volatile solvent, thermally treating the capacitor element, and allowing the capacitor element to be impregnated with an oxidant solution, whereby a solid electrolytic layer of higher quality can be formed inside the wound capacitor element, so that the resulting electrolytic capacitor can procure more excellent electrical performance. The process is highly productive and very practical, particularly because economical and readily handleable volatile solvents can be used at the process and because the thermal treatment therein is completed in only several minutes.

What is claimed is:

1. A solid electrolytic capacitor comprising a capacitor element fabricated by winding an anode electrode foil and a cathode electrode foil through the medium of a separator, the capacitor element being impregnated with 3,4-ethylenedioxythiophene and an oxidant to form poly (ethylenedioxythiophene) by chemical polymerization, said capacitor comprising:

a nonwoven fabric being composed chiefly of a synthetic fiber and used as the separator.

2. A solid electrolytic capacitor according to claim 1, wherein the separator comprises a nonwoven fabric composed of vinylon fiber, or vinylon fiber mixed with glass fiber, polyester fiber, nylon fiber, rayon fiber or paper fiber.

3. A process for producing a solid electrolytic capacitor comprising the steps of: winding an anode electrode foil and a cathode electrode foil through the medium of a separator to fabricate a capacitor element; and allowing the fabricated capacitor element to be impregnated with 3,4-ethylenedioxythiophene and an oxidant to form poly (ethylenedioxythiophene) by chemical polymerization, said process further comprising:

in the foil winding step, a nonwoven fabric composed chiefly of a synthetic fiber being used as the separator; and the steps of:

dissolving and removing a binder in the separator, by dipping the capacitor element wound by using the separator in water at 80° C. to 100° C. for one to 10 minutes; and after the binder dissolving and removing step, for the binder-removed capacitor element, the impregnation step with the 3,4-ethylenedioxythiophene and the oxidant is performed.

4. A process for producing a solid electrolytic capacitor according to claim 3, wherein the separator comprises a nonwoven fabric composed of vinylon fiber, or vinylon fiber mixed with glass fiber, polyester fiber, nylon fiber, rayon fiber or paper fiber.

5. A process for producing a solid electrolytic capacitor according to claim 3, said process further comprising the steps of:

after the binder dissolving and removing step, drying the capacitor element at 80° C. to 120° C.; and after the drying step of the capacitor element, for the dried capacitor element, the impregnation step with the 3,4-ethylenedioxythiophene and the oxidant is performed.

6. A process for producing a solid electrolytic capacitor according to claim 5, wherein the separator comprises a nonwoven fabric composed of vinylon fiber, or vinylon fiber mixed with glass fiber, polyester fiber, nylon fiber, rayon fiber or paper fiber.

7. A process for producing a solid electrolytic capacitor according to claim 5, wherein a series of the steps composed of the binder dissolving and removing step and the drying step of the capacitor element is repeated at least two times.

8. A process for producing a solid electrolytic capacitor comprising the steps of: winding an anode electrode foil and a cathode electrode foil through the medium of a separator to fabricate a capacitor element; and allowing the fabricated capacitor element to be impregnated with 3,4-ethylenedioxythiophene and an oxidant to form poly (ethylenedioxythiophene) by chemical polymerization, said process further comprising:

in the impregnation step of the capacitor element, an oxidant at a concentration above 40% by weight to a solvent being used as the oxidant.

9. A process for producing a solid electrolytic capacitor according to claim 8, wherein the solvent is butanol.

10. A process for producing a solid electrolytic capacitor according to claim 8, wherein the oxidant is selected from the group consisting of ferric p-toluenesulfate, ferric dodecylbenzenesulfonate and ferric chloride.

11. A process for producing a solid electrolytic capacitor comprising the steps of: winding an anode electrode foil and a cathode electrode foil through the medium of a separator to fabricate a capacitor element; and allowing the fabricated capacitor element to be impregnated with 3,4-ethylenedioxythiophene and an oxidant to form poly (ethylenedioxythiophene) by chemical polymerization, said process further comprising:

the impregnation step including the steps of:

allowing the capacitor element to be impregnated with a monomer 3,4-ethylenedioxythiophene; and after the monomer impregnation step, allowing the resulting capacitor element to be impregnated with an oxidant.

12. A process for producing a solid electrolytic capacitor comprising the steps of: winding an anode electrode foil and a cathode electrode foil through the medium of a separator to fabricate a capacitor element; and allowing the fabricated capacitor element to be impregnated with 3,4-ethylenedioxythiophene and an oxidant to form poly (ethylenedioxythiophene) by chemical polymerization, said process further comprising:

the impregnation step including the steps of:

allowing the capacitor element to be impregnated with a monomer solution of a mixture of 3,4-ethylenedioxythiophene and a volatile solvent;

after the monomer solution impregnation step, subjecting the resulting capacitor element to thermal treatment; and after the thermal treatment step, allowing the capacitor element to be impregnated with an oxidant solution.

13. A process for producing a solid electrolytic capacitor according to claim 12, wherein the volatile solvent is a material selected from the group consisting of hydrocarbons, ethers, esters, ketones, alcohols and nitrogen compounds.

14. A process for producing a solid electrolytic capacitor according to claim 13, wherein the volatile solvent is a material selected from the group consisting of methanol, ethanol and acetone.

15. A process for producing a solid electrolytic capacitor according to claim 12, wherein, in the monomer solution impregnation step, the 3,4-ethylenedioxythiophene and the volatile solvent are separately used for impregnation.

16. A process for producing a solid electrolytic capacitor according to claim 12, wherein, in the monomer solution impregnation step, a monomer solution of a mixture of the 3,4-ethylenedioxythiophene and the volatile solvent at a volume ratio of 1:1 to 1:3.

* * * * *